No. 791,366.

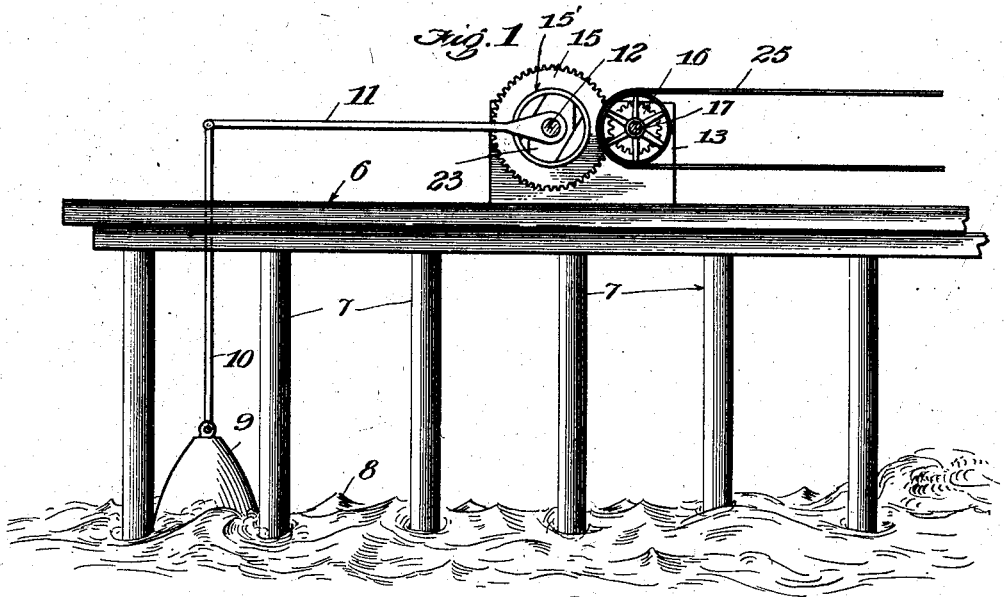
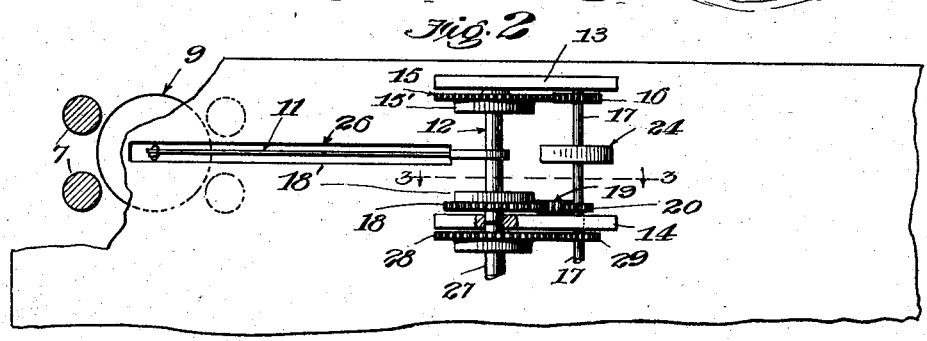
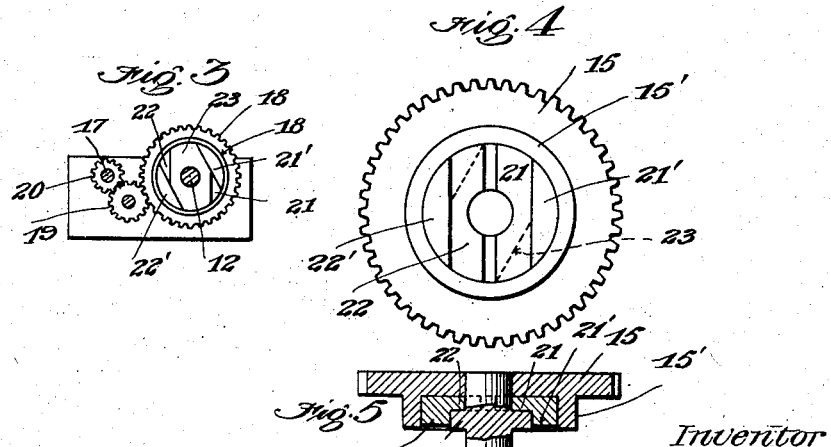

Patented May 30, 1905.

UNITED STATES PATENT OFFICE.

THEODORE RAPP, OF LOS ANGELES, CALIFORNIA.

WAVE-MOTOR.

SPECIFICATION forming part of Letters Patent No. 791,366, dated May 30, 1905.

Application filed March 13, 1905. Serial No. 249,944.

*To all whom it may concern:*

Be it known that I, THEODORE RAPP, a citizen of the United States, residing at Los Angeles, in the county of Los Angeles and State of California, have invented new and useful Improvements in Wave-Motors, of which the following is a specification.

My invention relates to means for utilizing motion imparted by the waves of a body of water to a buoyant float, and also to utilize the weight of the float; and the object thereof is to provide a wave-motor which will exert a constant power in one direction. I accomplish this object by means of the mechanism described herein and illustrated in the accompanying drawings, in which—

Figure 1 is a side elevation of my improved wave-motor located upon a fragment of a wharf. Fig. 2 is a plan of so much of my improved wave-motor as is necessary to illustrate my invention, a part of the wharf being broken away for clearness of illustration. Fig. 3 is a cross-section on line 3 3 of Fig. 2 looking in the direction indicated by the arrows. Figs. 4 and 5 are details of the clutch and transmission gears.

In the drawings, 6 is the floor of a wharf, which is supported by piles 7, driven into the bed (not shown) of the ocean 8 in the usual manner. The wharf extends from the shore (not shown) a sufficient distance to give a depth of water at low tide to produce the proper wave effect upon the buoy 9, which is guided in its rise and fall by four piles, two of which are shown in full lines and two in dotted lines in Fig. 2. This buoy is connected by rod 10 to the outer end of driving-lever 11, which lever is rigidly secured to driving-shaft 12, which is mounted in bearings 13 and 14, secured to the wharf. Revolubly mounted on the driving-shaft is a driving-gear 15, which meshes with a driven gear 16 on the driven shaft 17. A similar but somewhat smaller driving-gear 18 is loosely mounted on the other end of the driving-shaft and meshes with an idler-gear 19, revolubly secured to bearing 14. This idler-gear meshes with a driven gear 20, which is rigidly mounted upon the driven shaft 17. As shown in Fig. 2, the driving-gear 18 and the driven gear 20 are somewhat smaller than the driving-gear 15 and the driven gear 16, but they have the same relative proportions. Driving-gear 15 has a hollow hub 15', and driving-gear 18 has a like hollow hub 18'. In these hollow hubs are mounted the clutch members 21 and 22, each of which is a little less than a half-circle, as best shown in Fig. 4, in which figure the driving-shaft and connected parts have been removed for clearness of illustration. These clutch members are provided with projecting segmental arms 21' and 22', between which arms is mounted the clutch-operating lever 23, which is rigidly secured to the driving-shaft, there being a clutch-operating lever within each hub of each driving-gear. These clutch-operating levers are so arranged on the driving-shaft that as the outer end of the driving-lever is moved upwardly the clutch member of one of the driving-gears is locked to the driving-shaft, while the clutch member of the other driving-gear is unlocked from the driving-shaft, and as the free end of the driving-lever is pulled down by the weight of the float the first driving-gear is unlocked from the driving-shaft and the second driving-gear is locked thereto, whereby continuous motion is imparted to the driven shaft by the rise and fall of the buoy. A pulley 24 on the driven shaft receives a belt 25, which transmits the power to the driven machinery. (Not shown.) A slot 26 in the floor of the wharf permits the driving-lever to adjust itself as the tide rises and falls in the ocean or other wave-producing body of water.

In the operation of my wave-motor as the waves lift the buoy the driving-lever operates the driving-shaft, we will say, to lock the gear 15 thereto, thus imparting motion to the gear 16. As the wave passes from under the buoy the weight thereof pulls the free end of the operating-lever down, thereby reversing the movement of the driving-shaft, which unlocks the clutch between said shaft and driving-gear 15 and at the same time locks gear 18 to the driving-shaft, thereby imparting motion in the same direction to the driven shaft through gears 19 and 20. In order that the driven shaft shall be continuously operated, I prefer to have a plurality of buoys connected up to independent driving-shafts, of which a second one, 27, is shown in Fig. 2 provided with a driving-gear 28, which meshes with a driven gear 29 on the driven shaft 17. It will be understood there are gears and clutches, levers, and buoys for each driving-shaft, as described herein and illustrated particularly in Fig. 2. The buoys should be so located with reference to the waves that there shall be continuous wave action upon said buoys, so that when some of the buoys are inert others are at their maximum power.

Having described my invention, what I claim as new, and desire to secure by Letters Patent, is—

1. A wave-motor comprising a driving-shaft revolubly mounted in bearings; a driving-lever rigidly secured to said shaft; a buoy operatively connected to the free end of said driving-lever; gears revolubly mounted on said driving-shaft, one on each end thereof, one of said gears being smaller than the other, clutches between said driving-shaft and said gear, said clutches being arranged in opposite directions; a driven shaft; a gear rigidly secured thereto and meshing with the larger gear on the driving-shaft; a smaller gear on said driven shaft in line with the smaller gear of the driving-shaft; an idler-gear meshing with said last-named gears.

2. In a wave-motor a driven shaft; a driving-shaft; connections between said driving-shaft and driven shaft so arranged that motion in either direction of the driving-shaft imparts the same motion to the driven shaft; a driving-lever rigidly connected to said driving-shaft; and a buoyant float operatively connected to the free end of said driving-lever.

In witness that I claim the foregoing I have hereunto subscribed my name this 7th day of March, 1905.

THEODORE RAPP.

Witnesses:
G. E. HARPHAM,
EDMUND A. STRAUSE.